US009022148B2

(12) United States Patent
Shen et al.

(10) Patent No.: US 9,022,148 B2
(45) Date of Patent: May 5, 2015

(54) DIAMOND BONDED CONSTRUCTION COMPRISING MULTI-SINTERED POLYCRYSTALLINE DIAMOND

(75) Inventors: Yuelin Shen, Houston, TX (US); Youhe Zhang, Spring, TX (US)

(73) Assignee: Smith International, Inc., Houston, TX (US)

( * ) Notice: Subject to any disclaimer, the term of this patent is extended or adjusted under 35 U.S.C. 154(b) by 578 days.

(21) Appl. No.: 12/903,071

(22) Filed: Oct. 12, 2010

(65) Prior Publication Data

US 2011/0083908 A1  Apr. 14, 2011

Related U.S. Application Data

(60) Provisional application No. 61/250,814, filed on Oct. 12, 2009.

(51) Int. Cl.
| | |
|---|---|
| *E21B 10/46* | (2006.01) |
| *B01J 3/06* | (2006.01) |
| *B24D 99/00* | (2010.01) |
| *E21B 10/567* | (2006.01) |

(52) U.S. Cl.
CPC ............ *B01J 3/062* (2013.01); *B01J 2203/062* (2013.01); *B01J 2203/0655* (2013.01); *B01J 2203/0685* (2013.01); *B24D 99/005* (2013.01); *E21B 10/5676* (2013.01)

(58) Field of Classification Search
USPC ..................... 175/426, 434; 51/307
See application file for complete search history.

(56) References Cited

U.S. PATENT DOCUMENTS

| | | | | |
|---|---|---|---|---|
| 6,544,308 | B2 * | 4/2003 | Griffin et al. .................... | 51/309 |
| 7,647,993 | B2 * | 1/2010 | Middlemiss .................. | 175/433 |
| 2005/0263328 | A1 * | 12/2005 | Middlemiss .................. | 175/434 |
| 2006/0157285 | A1 * | 7/2006 | Cannon et al. ................. | 175/374 |
| 2007/0029114 | A1 * | 2/2007 | Middlemiss .................. | 175/374 |

* cited by examiner

*Primary Examiner* — Catherine Loikith
(74) *Attorney, Agent, or Firm* — Snell & Wilmer L.L.P.

(57) ABSTRACT

Diamond bonded constructions comprise a diamond body attached to a substrate, wherein the body includes a first diamond bonded volume, and a second diamond bonded volume attached thereto. The second volume may be provided in the form of a powder or a presintered mass prior to attachment, and the first volume may be provided in the form of presintered pieces when combined with the second volume. The first volume diamond volume content is greater than about 94 percent, and is the same or greater than that of the second volume. The first volume is sintered during a first HPHT process, and the second volume is sintered and/or attached to the first volume during a second HPHT process. The first HPHT pressure is greater than the second HPHT pressure. The substrate is not an infiltration substrate used to form the first diamond volume. The diamond body may be thermally stable.

19 Claims, 4 Drawing Sheets

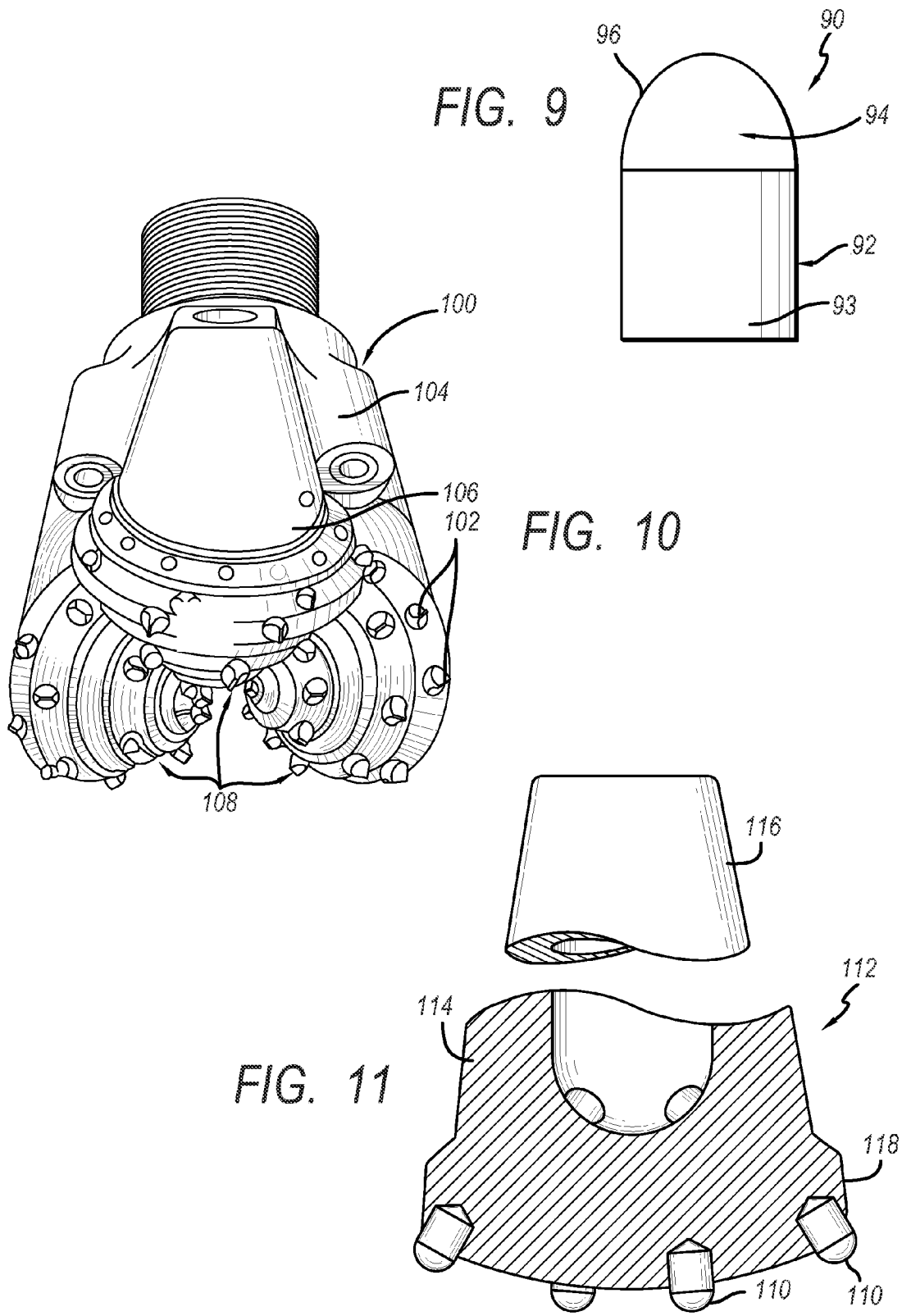

DIAMOND BONDED CONSTRUCTION COMPRISING MULTI-SINTERED POLYCRYSTALLINE DIAMOND

CROSS-REFERENCE TO RELATED APPLICATIONS

This patent application claims priority from U.S. Provisional Patent Applications 61/250,814 filed on Oct. 12, 2009, which is herein incorporated by reference in its entirety.

BACKGROUND OF THE INVENTION

1. Field of the Invention

This invention generally relates to diamond bonded constructions and, more particularly, to diamond bonded compact constructions that are specially engineered having a diamond body bonded to a substrate, wherein the diamond body includes multi-sintered polycrystalline diamond to provide a construction having reduced residual stresses and cracks to provide improved performance properties and service life when compared to conventional diamond bonded constructions.

2. Background of the Invention

The use of constructions comprising a body formed from ultra-hard materials such as diamond, polycrystalline diamond (PCD), cubic boron nitride (cBN), polycrystalline cubic boron nitride (PcBN) are well known in the art. Examples of such constructions may be found in the form of cutting elements comprising an ultra-hard component or body that is joined to a metallic component or substrate. In such cutting elements, the wear or cutting portion is formed from the ultra-hard component and the metallic portion is provided for the purpose of attaching the cutting element to a desired wear and/or cutting device. In such known constructions, the ultra-hard component may be formed from those ultra-hard materials described above that provide a high level of wear and/or abrasion resistance that is greater than that of the metallic component.

The use of PCD as an ultra-hard material for forming such constructions is well known in the art. PCD is formed by subjecting a volume of diamond grains to high pressure/high temperature (HPHT) conditions in the presence of a suitable catalyst material, such as a solvent catalyst metal selected from Group VIII of the Periodic table. Oftentimes, the source of the solvent catalyst material used to form PCD is the substrate, wherein the solvent catalyst material is present as a constituent of the substrate that migrates therefrom and infiltrates into the adjacent diamond body during HPHT processing. The resulting construction is a PCD compact comprising the PCD body joined to the substrate.

An issue known to exist with such conventional PCD compact constructions is the presence of relatively high levels of residual stress in the diamond body and/or in the substrate adjacent the interface between the two. This residual stress may be created during the HPHT process used to form the PCD body and/or during the brazing process that is used to attach the compact to an end-use device, such as a bit used for drilling subterranean formations. Such high levels of residual stress exist in PCD compacts comprising a PCD body formed from relatively fine-sized diamond grains and having a relatively low metal content, where higher pressures are needed to achieve better sintering. The use of such higher sintering pressures is believed to contribute to the higher level of residual stress present in such PCD compact constructions. Such residual stress may cause cracking to occur within the diamond body and/or substrate when the compact is attached to an end-use device and/or placed in a wear or cutting operation, and may result in premature compact failure.

It is, therefore, desired that diamond bonded constructions be constructed in a manner that provides a reduced or eliminated degree of residual stress when compared to conventional PCD compact constructions. It is also desired that such diamond body constructions, and methods useful for making the same, facilitate the formation of diamond bonded constructions comprising diamond bonded bodies formed from relatively fine-sized diamond grains and having a relatively low metal content. It is further desired that such diamond bonded constructions be made in a manner that does not sacrifice desired properties of wear resistance, abrasion resistance, impact resistance, and fracture toughness when compared to conventional PCD compact constructions. It is still further desired that such diamond bonded constructions be produced in a manner that is efficient and does not involve the use of exotic materials and/or techniques.

SUMMARY OF THE INVENTION

Diamond bonded constructions prepared according to principles of the invention comprise a diamond body that is attached to a metallic substrate. The diamond body is specially engineered to include polycrystalline diamond that has been subjected to multiple HPHT sintering conditions aimed at reducing or eliminating the unwanted presence of residual stress within the construction.

The diamond body includes a first diamond bonded volume that has been formed during a first HPHT process, and a second diamond bonded volume that is attached to the first diamond bonded volume. The first diamond volume comprises a diamond volume content that is greater than about 94 percent, The second diamond volume may be provided in the form of an unsintered or presintered volume, and when combined with the first diamond bonded volume is subjected to a second HPHT process for joining the two diamond volumes together and/or sintering the second diamond volume. The second diamond volume may have a diamond volume content that is less than that of the first diamond volume. The pressure used during the first HPHT process is greater than that used during the second HPHT process.

In an example embodiment, the first diamond volume is provided in the form of a single mass or body, and is combined with a second diamond volume that is provided in the form of a single presintered mass or that forms a single mass during the second HPHT process. In another example embodiment, the first diamond volume is provided in the form of a plurality of sintered pieces that are disposed within a second diamond volume provided in the form of unsintered volume of diamond grains, wherein the combination is then subjected to the second HPHT process.

The diamond body is attached to a substrate or support during the second HPHT process. The support may have a material composition that is different than any substrate that may be used as a source/infiltrant of catalyst material useful for forming the first diamond volume during the first HPHT process. The interface between the diamond body and the substrate or support may be planar or nonplanar, as with the interface between the first and second diamond volumes.

The entire or a partial region of the diamond body may be treated to be thermally stable by removing the catalyst material therefrom. The thermally stable region may be further treated to comprise a replacement material disposed therein.

Diamond bonded constructions of this invention comprising the multi-sintered diamond body, and not including the initial infiltration substrate attached thereto, display reduced levels of residual stress when compared to conventional PCD constructions. The use of multiple HPHT processes operate to optimize the sintered properties of the construction, such as abrasion resistance, wear resistance, fracture toughness, impact strength, and thermal stability without compromising such properties due to the sintering process. Diamond bonded constructions permit the use of a final substrate specially selected to provide improved end-use properties, such as erosion resistance in the like, when compared to conventional PCD constructions comprising only an infiltration substrate, thereby operating to improve effective service life.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 9 is a perspective side view of an insert comprising the diamond bonded construction;

FIG. 10 is a perspective side view of a rotary cone drill bit comprising a number of the inserts of FIG. 9; and FIG. 11 is a perspective side view of a percussion or hammer bit comprising a number of the inserts of FIG. 9.

DETAILED DESCRIPTION

Figure 1:
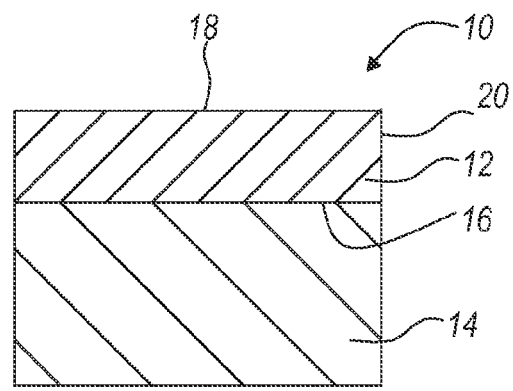
FIG. 1 is a cross sectional side view of a diamond bonded body comprising a substrate attached thereto that was used to sinter the diamond bonded body.

Diamond bonded constructions of this invention comprise a diamond bonded body formed from polycrystalline diamond (PCD). The diamond bonded body may include a region of thermally stable polycrystalline diamond (TSP), wherein such region of TSP may or may not be filled with an infiltrant material. In one embodiment, the diamond bonded body is attached to a substrate and comprises a first diamond bonded volume attached to a second diamond bonded volume, wherein the first diamond body is sintered during a relatively higher pressure HPHT process than that of a second HPHT process used to join the first and second diamond bonded bodies together.

In another embodiment, the diamond body is attached to a substrate and comprises a plurality of sintered diamond bonded particles or pieces disposed within a sintered diamond bonded volume, wherein the sintered diamond bonded pieces are formed during a relatively higher pressure HPHT process than that of a second HPHT process used to form the sintered diamond bonded volume.

The first diamond bonded volume and the sintered diamond bonded pieces of such example embodiments may be formed by using relatively fine-sized diamond grains, and may have a relatively lower catalyst material content (or a relatively higher diamond volume content) than the second diamond bonded volume and surrounding diamond bonded volume respectively.

While the body has been described above as a diamond bonded body, it is to be understood that the body may be formed from ultra-hard materials other than diamond. As used herein, the term "ultra-hard" is understood to refer to those materials known in the art to have a grain hardness of about 4,000 HV or greater. Such ultra-hard materials may include those capable of demonstrating physical stability at temperatures above about 750° C., and for certain applications above about 1,000° C., that are formed from consolidated materials. Such ultra-hard materials may include but are not limited to diamond, cubic boron nitride (cBN), diamond-like carbon, boron suboxide, aluminum manganese boride, and other materials in the boron-nitrogen-carbon phase diagram which have shown hardness values similar to cBN and other ceramic materials.

PCD is an ultra-hard material formed in the manner noted above by subjecting a volume of diamond grains to HPHT conditions in the presence of a catalyst material. The catalyst material may be a solvent catalyst metal, such as one or more selected from Group VIII of the Periodic table. As used herein, the term "catalyst material" refers to the material that was initially used to facilitate diamond-to-diamond bonding or sintering at the initial HPHT conditions used to form the PCD. PCD has a material microstructure comprising a matrix phase of intercrystalline bonded diamond, and a plurality of interstitial regions dispersed within the matrix phase, wherein the catalyst material is disposed within the interstitial regions.

TSP is formed by removing the catalyst material from PCD, so that the remaining diamond structure is substantially free of the catalyst material. TSP has a material microstructure characterized by a matrix phase of intercrystalline bonded diamond, and a plurality of empty interstitial regions dispersed within the matrix phase. If desired, the empty interstitial regions may be filled with a desired replacement or infiltrant material as described below. Alternatively, TSP may include embodiments where instead of removing the catalyst material, the catalyst material has been treated so that it no longer functions as a catalyst when the diamond body is subjected to elevated temperatures.

Diamond grains useful for forming the diamond bonded body may include natural and/or synthetic diamond powders having an average diameter grain size in the range of from submicrometer in size to 100 micrometers, and more preferably in the range of from about 1 to 80 micrometers. The diamond powder may contain grains having a mono or multimodal size distribution. In an example embodiment, the diamond powder used to form the first diamond bonded volume or plurality of sintered diamond bonded particles has an average particle grain of less than about 10 micrometers. The diamond powder used to form the second diamond bonded volume or surrounding diamond bonded body may be the same as or different from that used to form the first diamond bonded volume or plurality of sintered diamond bonded particles. In the event that diamond powders are used having differently sized grains, the diamond grains are mixed together by conventional process, such as by ball or attritor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material may be provided by infiltration from a substrate positioned adjacent the diamond powder and that includes the catalyst material. Suitable substrates useful as a source for infiltrating the catalyst material may include those used to form conventional PCD materials, and may be provided in powder, green state and/or already-sintered form. A feature of such substrate is that it includes a metal solvent catalyst that is capable of melting and infiltrating into the adjacent volume of diamond powder to facilitate bonding the diamond grains together during the HPHT process.

In an example embodiment, the substrate can be selected from the group including metallic materials, ceramic materials, cermet materials, and combinations thereof. Example substrate comprise a hard materials like carbides such as WC, $W_2C$, TiC, VC, or ultra-hard materials such as synthetic diamond, natural diamond and the like, wherein the hard or ultra-hard materials may include a softer binder phase comprising one or more Group VIII material such as Co, Ni, Fe, and Cu, and combinations thereof. In an example embodiment, the catalyst material is Co, and a substrate useful for providing the same is a cobalt containing substrate, such as WC—Co.

Alternatively, the diamond powder mixture may be provided in the form of a green-state part or mixture comprising diamond powder that is combined with a binding agent to provide a conformable material product, e.g., in the form of diamond tape or other formable/conformable diamond mixture product to facilitate the manufacturing process. In the event that the diamond powder is provided in the form of such a green-state part, it is desirable that a preheating step take place before HPHT consolidation and sintering to drive off the binder material. In an example embodiment, the PCD material resulting from the above-described HPHT process when used to form the first diamond bonded volume or plurality of sintered diamond bonded particles may have a diamond volume content of greater than about 94 percent. In an example embodiment, the PCD material resulting from the above-described HPHT process when used to form the second diamond bonded volume or surrounding diamond bonded volume may have a diamond volume content that is the same as or less than that of first diamond bonded volume or plurality of sintered diamond bonded particles, e.g., may be between about 85 to 94 percent.

The diamond powder mixture or green-state part is loaded into a desired container for placement within a suitable HPHT consolidation and sintering device. The HPHT device is activated to subject the container to a desired HPHT condition to consolidate and sinter the diamond powder. In an example embodiment, the device is controlled so that the container is subjected to a HPHT process having a pressure of 5,000 MPa or greater and a temperature of from about 1,350° C. to 1,500° C. for a predetermined period of time. At this pressure and temperature, the catalyst material melts and infiltrates into the diamond powder mixture, thereby sintering the diamond grains to form PCD. After the HPHT process is completed, the container is removed from the HPHT device, and the so-formed PCD part is removed from the container.

FIG. 1 illustrates a PCD construction 10 prepared in the manner described above comprising a PCD body 12 that is attached to an initial or infiltration substrate 14 during HPHT processing. The initial substrate 14 is selected for the purpose of introducing a desired catalyst material into the diamond volume for sintering during the HPHT process. An interface surface 16 between the PCD body 12 and the initial substrate 14 may be planar or nonplanar.

The PCD body 12 includes top and side surfaces 18 and 20 that may or may not be working surfaces. If desired, the PCD body 12 may have a beveled edge running between the top and side surfaces. The PCD body may be configured having a desired form for a particular end-use application without any further shaping or sizing. Alternatively, the PCD body may initially be configured having a form that facilitates HPHT processing, and then be shaped or sized as desired for use in the end-use application.

Figure 2:
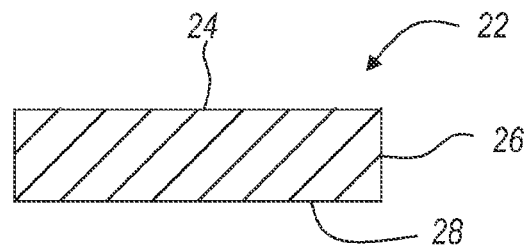
FIG. 2 is a cross sectional side view of a diamond bonded body.

FIG. 2 illustrates a PCD body 22 without an initial or infiltrant substrate attached thereto. In the event that an infiltration substrate was used to form the PCD body (as illustrated in FIG. 1), it is removed from the PCD body for the purpose of joining the body to a desired final substrate. In the event that the PCD body 22 was formed without using such infiltration substrate, it is then ready for further processing.

In a first embodiment, the PCD body is attached to a second diamond volume using a relatively lower pressure HPHT process than that used to sinter the PCD body 22 as better described below. In a second embodiment, the PCD body is formed into pieces of desired size and shape for subsequent introduction into a surrounding diamond volume that is then sintered using a relatively lower pressure HPHT process than that used to sinter the PCD body 22 as better described below. The PCD body 22 may include the same surfaces noted above 24 and 26, and may have a planar or nonplanar substrate interface surface 28. The pieces in the second embodiment may have random shapes/sizes or may be shaped having a common desired configuration and/or sizes, e.g., in the form of granules or the like.

Figure 3:
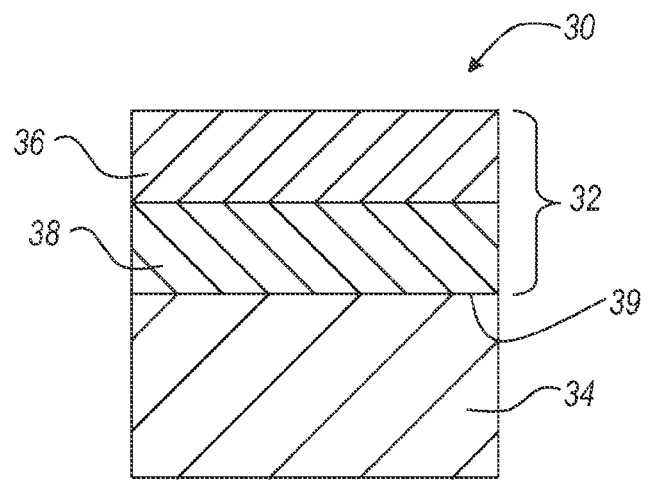
FIG. 3 is a cross sectional side view of a first embodiment diamond bonded construction comprising the diamond bonded body of FIG. 2 attached to second diamond body that is in turn attached to a substrate.

FIG. 3 illustrates an example embodiment diamond bonded construction 30 comprising a diamond bonded body 32 that is attached to a substrate 34, wherein the diamond bonded body 32 comprises a first sintered diamond bonded volume 36 and a second sintered diamond bonded volume 38. The first diamond bonded volume comprises the PCD body described above and illustrated in FIG. 2. In an example embodiment, the first diamond bonded body is formed from diamond grains having an average grain size of less than about 10 microns, and having a high diamond volume content of greater than about 94 percent, that is formed during a relatively high pressure HPHT process.

In an example embodiment, the first sintered diamond bonded volume 36 is configured in the form of a shaped region, for example in the form of a disk-shaped region that extends along at least a portion of the underlying surface of the second sintered diamond bonded volume. In a preferred embodiment, the first sintered diamond bonded volume substantially covers the entire top surface of the underlying second sintered diamond bonded volume. In such example embodiment, the second sintered diamond bonded volume is interposed between the first sintered diamond bonded volume and the substrate so that the first sintered diamond bonded volume does not contact the substrate.

It is desired that the first diamond bonded body have this material construction for the purpose of providing combined desired properties of high abrasion and wear resistance, and high thermal stability. In an example embodiment, the first diamond bonded body is formed at pressures of greater than about 6,500 Mpa, as such relatively high HPHT pressures are needed to ensure complete sintering of the diamond bonded body to provide the desired performance properties.

It has been discovered that conventional PCD constructions, comprising diamond bonded bodies having the above-noted material construction and attached to the substrate during HPHT formation, have high levels of residual stress within the diamond body and/or substrate, which may cause unwanted cracking during use or during attachment of the construction to an end-use device, e.g., by welding or the like. In this first embodiment diamond bonded construction, the presence of such unwanted residual stress is avoided or minimized by removing any infiltration substrate from the PCD body and attaching the PCD body to a second diamond volume during a relatively lower pressure second HPHT process.

The second diamond volume 38 may be provided in the form of an unsintered powder volume, an unsintered green-state part or volume, or a presintered (already-sintered) diamond bonded body. In an example embodiment, the second diamond volume is provided in the form of a presintered diamond bonded body before being attached to the first diamond bonded volume, in which case the material properties of the second diamond bonded volume may be the same or different from that of the first diamond bonded body. In an example embodiment, where the second diamond volume is provided as a presintered diamond bonded body before attachment to the first diamond body, it is desired that the second diamond volume have a diamond content that is less than that of the first diamond bonded body to drive infiltration of a metal constituent into the first diamond bonded body to facilitate attachment therewith, and to facilitate infiltration of a metal constituent into the second diamond volume from the substrate to facilitate attachment therewith.

The first diamond bonded volume and the sintered second diamond bonded volume are combined with a substrate to form an assembly, wherein the second diamond volume is interposed between the first diamond bonded volume and the substrate, and the assembly is loaded into a HPHT device and subjected to a second HPHT process. As noted above, the pressure that is used during this second HPHT process is less than that used to form the first diamond bonded volume for the purpose of minimizing the introduction of any residual stress within the resulting construction.

The pressure used during this second HPHT process is sufficient to both form desired attachments between the first and second diamond bonded volumes, and between the substrate and the resulting diamond bonded body, and to provide a finally sintered construction having a desired combination of performance properties, such as wear resistance, abrasion resistance, fracture toughness, impact resistance, delamination resistance, and thermal stability. In an example embodiment, the pressure that is used during this second HPHT process may be less than about 6,500 Mpa, and in the range of from about 5,500 to 6,500 to Mpa.

In another embodiment, the second diamond bonded volume 38 may be provided in the form of an unsintered powder volume and/or an unsintered green state volume that is combined with and interposed between the first diamond bonded volume 36 and the substrate 34 to form an assembly for placement in a HPHT device. The assembly is then subjected to a second HPHT process. As noted above, the pressure that is used during this second HPHT process is less than that used to form the first diamond bonded volume for the purpose of minimizing the introduction of any residual stress within the resulting construction.

The pressure used during this second HPHT process is sufficient to sinter the second diamond volume, form the desired attachments between the first and second diamond bonded volumes, and between the substrate and the resulting diamond bonded body, and to provide a finally sintered construction having a desired combination of performance properties, such as wear resistance, abrasion resistance, fracture toughness, impact resistance, delamination resistance, and thermal stability. In an example embodiment, the pressure that is used during this second HPHT process is the same as that disclosed above when the second diamond volume is provided in a presintered state.

The substrate or final substrate used for forming this example embodiment diamond bonded construction, e.g., during the second HPHT process, may be formed from the same types of substrates that are used to form conventional PCD constructions. Alternatively, in the event that the embodiment being formed makes use of a presintered diamond volume, e.g., where a sintering infiltration of a catalyst material from the substrate during second HPHT processing is not important, then the material selection for the substrate may be different from that used to form conventional PCD. Materials useful as the substrate in the second HPHT process include those selected from the group including metallic materials, ceramic materials, cermet materials, and combinations thereof.

In the event that the final substrate used during the second HPHT process does not function primarily as a source of infiltrant for sintering, the substrate may be formed from a material is relatively better suited for use of the construction in an end-use application than an infiltration substrate used to form the PCD body. For example, the substrate may have a material composition comprising a lesser amount of a binder material, such as a Group VIII material or the like, than that of an infiltrant substrate, making it less well suited for infiltration and sintering purposes, while providing an improved degree of erosion resistance and making it better suited for end-use purposes.

In an example embodiment where the second diamond volume is provided in presintered form, the PCD construction may be formed during a first HPHT process using a WC—Co initial substrate having a WC particle size of about 3 microns and having a Co content of about 14 percent by weight, and the construction may be formed during a second HPHT process using a final substrate having the same WC particle size and a Co content of about 11 percent by weight. Such an initial substrate includes a Co content that facilitates infiltration and sintering during HPHT processing, while such a final substrate has a reduced Co content that provides a desired improvement in erosion resistance to facilitate end use. In the event that the second diamond volume is unsintered, then the final substrate may be formed form the same material selected for the infiltration substrate. It is understood that this description is representative of only one example construction, and that initial and final substrates having constructions and/or properties other than those described may be used to form diamond bonded constructions.

An interface surface 39 between the diamond bonded body 32 and the substrate 34 may be planar or nonplanar depending on the particular end-use application. In an end-use application calling for a high degree of delamination resistance, a nonplanar interface may be desired to provide an enhanced degree of attachment strength between the substrate and the diamond bonded body. Additionally, an interface surface between the first and second diamond bonded volumes may be planar or nonplanar. Wherein a nonplanar interface with the diamond bonded body may provide a further enhanced degree of delamination resistance during use.

Figure 4:
FIG. 4 is a cross sectional side view of a volume of diamond bonded particles.

FIG. 4 illustrates a volume of sintered diamond bonded pieces 40 that may be provided in the form of individual granules, particles or segments 42, and that may be formed by treating the PCD body of FIG. 2 in an appropriate manner to obtain the size and shape desired for a particular end-use application. As noted above, such pieces are sintered during a relatively high pressure HPHT process. Alternatively, the sintered diamond bonded pieces may be formed individually rather than from a single PCD body.

Figure 5:
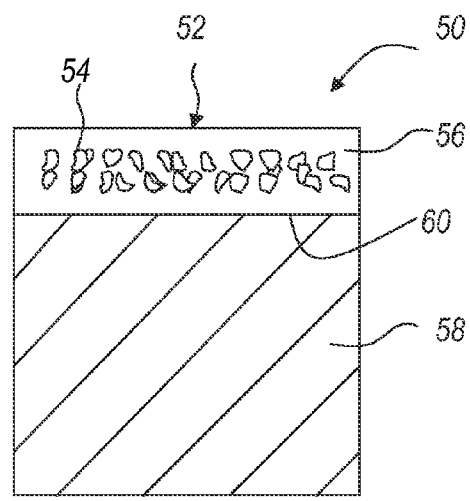
FIG. 5 is a cross sectional side view of an assembly comprising the volume of diamond bonded particles of FIG. 4 disposed within a further diamond volume for HPHT processing.

FIG. 5 illustrates a diamond bonded assembly 50 comprising a diamond body 52 including the sintered diamond bonded pieces 54 from FIG. 4 disposed within a surrounding diamond volume 56. The diamond body 52 is attached to a substrate 58 selected from the materials noted above at interface 60. The assembly 50 is provided for placement within a HPHT device.

The volume content of the diamond bonded pieces 54 within the diamond body 52 in this assembly may vary depending on the particular end-use application, and in an example embodiment is in the range of from about 40 to 90 percent, preferably in the range of from about 50 to 80 percent, and more preferably in the range of from about 60 to 70 percent. The surrounding diamond volume 56 may have a diamond volume content and be formed from diamond grains that are sized as noted above for the second diamond volume of the earlier embodiment. In an example embodiment, the surrounding diamond volume has a material composition that will facilitate sintering at a HPHT process pressure that is less than the HPHT process pressure used to sinter the diamond pieces.

Figure 6:
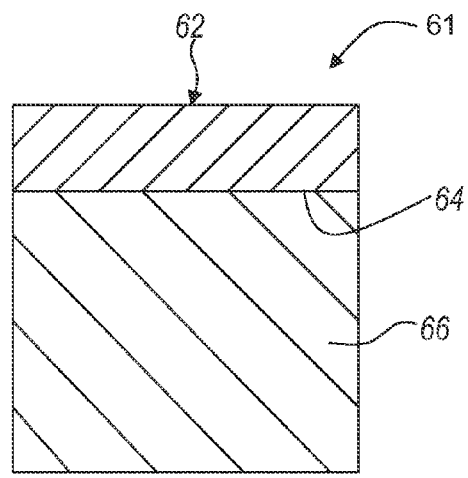
FIG. 6 is a cross-sectional side view of a second embodiment diamond bonded construction formed by sintering the assembly of FIG. 5, comprising a diamond bonded body including the diamond bonded particles of FIG. 4 and being attached to a substrate.

FIG. 6 illustrates a second embodiment diamond bonded construction 61 formed by subjecting the assembly of FIG. 5 to a second HPHT process, thereby sintering the surrounding diamond volume and attaching the same to the substrate. The construction 61 comprises a composite diamond bonded body 62 having a material microstructure comprising a plurality of first diamond bonded phases or regions (formed from the sintered diamond bonded pieces) dispersed within a surrounding second diamond bonded phase or region (formed from the now sintered surrounding diamond volume). Because the first and second phases are formed from PCD having different material compositions, the two phases have different performance properties. For example, when the diamond bonded pieces are formed from the PCD body described above, the first diamond bonded phases may have properties of abrasion resistance, wear resistance, and thermal stability that are greater that that of the surrounding second diamond bonded phase.

An interface surface 64 between the diamond bonded body 62 and the substrate 66 may be planar or nonplanar depending on the particular end-use application. In an end-use application calling for a high degree of delamination resistance, a nonplanar interface may be desired to provide an enhanced degree of attachment strength between the substrate and the diamond bonded body.

If desired, the diamond bonded body may be treated to remove the catalyst material therefrom, thereby providing a resulting diamond body having improved properties of thermal stability. Depending on the particular end-use applications, the entire diamond bonded body or only a region of the diamond bonded body may be treated in this matter. The term "removed", as used with reference to the catalyst material is understood to mean that a substantial portion of the catalyst material no longer resides within the treated region of the diamond body. However, it is to be understood that some small amount of catalyst material may still remain in the part, e.g., within the interstitial regions and/or adhered to the surface of the diamond crystals. Additionally, the term "substantially free", as used herein to refer to the catalyst material in the treated region of the diamond body, is understood to mean that there may still be some small/trace amount of catalyst material remaining within the treated diamond body as noted above.

In an example embodiment, the diamond bonded body may be treated to render the entire diamond bonded body or only a region thereof substantially free of the catalyst material by chemical treatment, such as by acid leaching or aqua regia bath, electrochemical treatment such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the diamond body by an acid leaching technique, such as that disclosed for example in U.S. Pat. No. 4,224,380. Accelerated techniques may be used to remove the catalyst material that include the use of elevated temperature and/or elevated pressure and/or sonic energy. The diamond bonded body may be subjected to such treatment before or after it is attached to the final substrate.

The treated region may include the first diamond bonded volume and/or the second diamond bonded volume of the first embodiment. The treated region of the diamond bonded body comprises a material microstructure having a polycrystalline diamond phase made up of a plurality of diamond grains or crystals that are bonded together, and a plurality of interstitial regions that are disposed between the bonded together diamond grains, and that exist as empty pores or voids within the material microstructure, as a result of the catalyst material being removed therefrom.

In an example embodiment where the region treated is not the entire diamond body, it is desired that such treated region extend a depth from a surface, which may be a working surface, of the diamond bonded body. In an example embodiment, the depth of such treated region may be about 0.05 mm or less, or may be about 0.05 to 0.4 mm. The exact depth of the treated region will depend on the end-use application.

In the event that the first diamond bonded volume is provided in the form of pieces, such pieces may be completely or partially treated to remove the catalyst material therefrom. If partially treated, such pieces may have an outer shell that is free of the catalyst material, and a core that includes the catalyst material.

If desired, the treated region of the diamond bonded body may be further treated so that all or a population of the interstitial regions within the part, previously empty by virtue of removing the catalyst material therefrom, are filled with a desired replacement or infiltrant material. In an example embodiment, such region may be filled, backfilled or reinfiltrated with a material that operates to minimize and/or eliminate unwanted infiltration of material from the final substrate, and/or that operates to improve one or more properties of the diamond bonded body.

Example replacement or infiltrant materials useful for treating the diamond bonded body may include materials selected from the group including metals, metal alloys, metal carbonates, carbide formers, i.e., materials useful for forming a carbide reaction product with the diamond in the body, and combinations thereof. Example metals and metal alloys include those selected from Group VIII of the Periodic table, examples carbide formers include those comprising Si, Ti, B, and others known to produce a carbide reaction product when combined with diamond at HPHT conditions. The infiltrant material preferably has a melting temperature that is within the diamond stable HPHT window, and may be provided in the form of a powder layer, a green state part, an already sintered part, or a preformed film. The diamond bonded body may be infiltrated during or independently of the process used to attach the diamond bonded body to the final substrate.

It is to be understood that the material selected to form the infiltrant material may permit some degree of catalyst material infiltration therein, possibly sufficient degree to form a desired attachment bond between the diamond bonded body and the final substrate, e.g., during an HPHT attachment process. If desired, the extent of backfilling or infiltrating the diamond bonded body may be controlled to leave a portion of the treated diamond bonded body uninfiltrated. This may either be done, for example, by careful control of the infiltration process or may be done after the diamond bonded body has been completely infiltrated by further treating the infiltrated region of the diamond bonded body to remove the infiltrant from a targeted region. For example, it may be desired that a surface portion of the diamond bonded body, and possibly a region extending from such surface, not include the infiltrant material for the purpose of providing a desired level of thermal stability, abrasion and/or wear resistance. In an example embodiment, such a surface portion of the diamond bonded body may form a surface portion, such as a working surface, of the final diamond bonded construction.

If desired, the sintered diamond particles of the second construction embodiment may be treated to remove all or part of the catalyst material, and may be further treated to include an infiltrant material. These treatments may be performed before the sintered diamond particles are disposed within the surrounding diamond volume for subsequent HPHT processing.

A feature of diamond bonded constructions of this invention is that they are specially engineered to have a reduced amount of residual stress when compared to conventional PCD constructions that are formed by using and that remain attached to a sintering substrate without further processing. Such reduction in residual stress operates to enhance the operating life of such constructions. Additionally, the diamond bonded body has been subjected to multiple HPHT processes aimed at optimizing the sintered properties of the construction, such as abrasion resistance, wear resistance, fracture toughness, impact strength, and thermal stability without compromising such properties due to the sintering process. Further, such diamond bonded constructions may include a final substrate selected to provide improved end-use properties, such as erosion resistance in the like, when compared to conventional PCD constructions comprising only an infiltration substrate, thereby operating to improve effective service life.

Diamond bonded constructions of this invention may be used in a number of different applications, such as tools for mining, cutting, machining, milling and construction applications, wherein properties of shear strength, thermal stability, wear and abrasion resistance, mechanical strength, and/or reduced thermal residual stress are highly desired. Constructions of this invention are particularly well suited for forming working, wear and/or cutting elements in machine tools and drill and mining bits such as roller cone rock bits, percussion or hammer bits, diamond bits, and shear cutters used in subterranean drilling applications.

Figure 7:
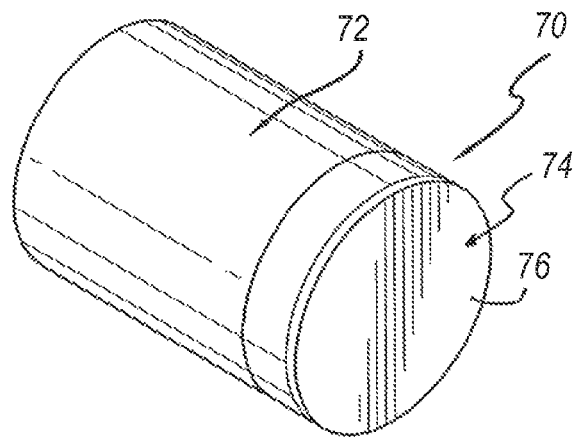
FIG. 7 is a perspective side view of a shear cutter comprising the diamond bonded construction.

FIG. 7 illustrates a diamond bonded construction embodied in the form of a shear cutter 70 used, for example, with a drag bit for drilling subterranean formations. The shear cutter 70 comprises a diamond bonded body 74 as described above. The diamond bonded body is attached to a cutter/final substrate 72. The diamond bonded body 74 includes a working or cutting surface 76.

Although the shear cutter in FIG. 7 is illustrated having a generally cylindrical configuration with a flat working surface that is disposed perpendicular to an axis running through the shear cutter, it is to be understood that shear cutters formed from diamond bonded constructions may be configured other than as illustrated and such alternative configurations are understood to be within the scope of this invention.

Figure 8:
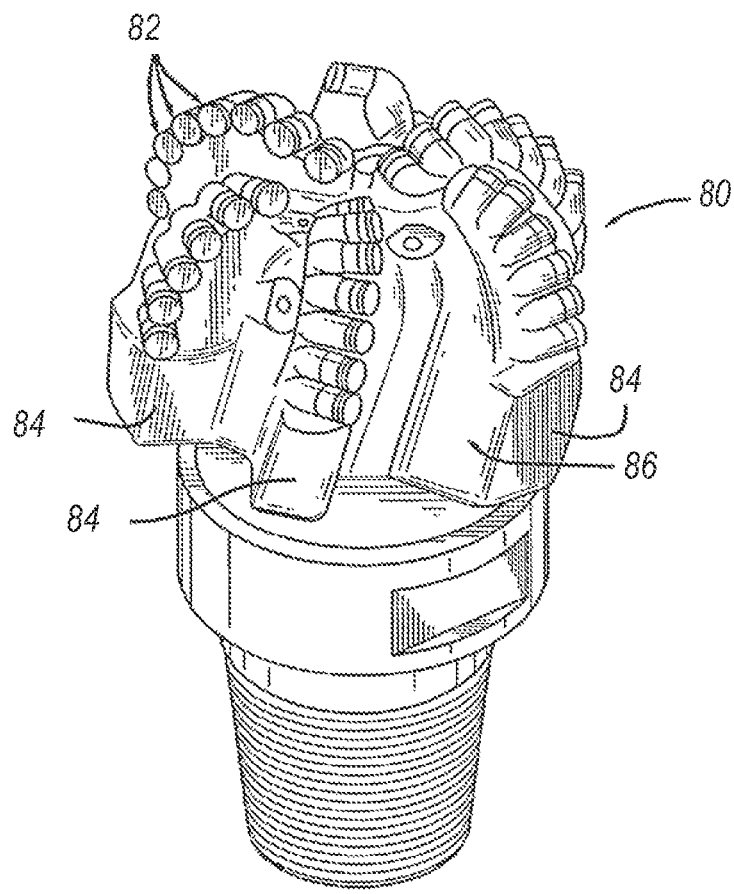
FIG. 8 is a perspective side view of a drag bit comprising a number of the shear cutters of FIG. 7.

FIG. 8 illustrates a drag bit 80 comprising a plurality of the shear cutters 82 described above and illustrated in FIG. 7. The shear cutters are each attached to blades 84 that extend from a head 86 of the drag bit for cutting against the subterranean formation being drilled.

FIG. 9 illustrates an embodiment of a diamond bonded construction in the form of an insert 90 used in a wear or cutting application in a roller cone drill bit or percussion or hammer drill bit used for subterranean drilling. For example, such inserts 90 may be formed from blanks comprising a substrate 92 formed from one or more of the final substrate materials 93 disclosed above, and a diamond bonded body 94 having a working surface 96. The blanks are pressed or machined to the desired shape of a roller cone rock bit insert.

Although the insert in FIG. 9 is illustrated having a generally cylindrical configuration with a rounded or radiused working surface, it is to be understood that inserts formed from diamond bonded constructions configured other than as illustrated and such alternative configurations are understood to be within the scope of this invention.

FIG. 10 illustrates a rotary or roller cone drill bit in the form of a rock bit 100 comprising a number of the wear or cutting inserts 102 disclosed above and illustrated in FIG. 9. The rock bit 100 comprises a body 104 having three legs 106, and a roller cutter cone 108 mounted on a lower end of each leg. The inserts 102 may be fabricated according to the method described above. The inserts 102 are provided in the surfaces of each cutter cone 108 for bearing on a rock formation being drilled.

FIG. 11 illustrates the inserts 110 described above as used with a percussion or hammer bit 112. The hammer bit comprises a hollow steel body 114 having a threaded pin 116 on an end of the body for assembling the bit onto a drill string (not shown) for drilling oil wells and the like. A plurality of the inserts 110 is provided in the surface of a head 118 of the body 114 for bearing on the subterranean formation being drilled.

Other modifications and variations of diamond bonded constructions and methods of forming the same according to the principles of this invention will be apparent to those skilled in the art. It is, therefore, to be understood that within the scope of the appended claims, this invention may be practiced otherwise than as specifically described.

What is claimed is:

1. A diamond bonded construction comprising:
   a diamond body comprising a matrix phase of intercrystalline bonded diamond, and a plurality of interstitial regions dispersed within the matrix phase, wherein the diamond body comprises:
   a first diamond bonded volume formed during a first high-pressure/high-temperature process; and
   a second diamond bonded volume that is attached to the first diamond bonded volume and that is formed during a second high-pressure/high-temperature process at a pressure that is less than a pressure of the first high-pressure/high-temperature process, wherein the first and second diamond bonded volumes each comprise the matrix phase and the plurality of interstitial regions; and
a metallic substrate attached to the diamond body during the second high-pressure/high-temperature process;
wherein the first diamond bonded volume occupies a first region of the diamond body extending from a top surface of the diamond body to a surface of the second diamond bonded volume, wherein the first region extends along and covers an entirety of the surface of the second diamond bonded volume, and wherein the second diamond bonded volume occupies a second region of the diamond body extending from the first diamond bonded body to the substrate.

2. The construction as recited in claim 1 wherein the first diamond bonded volume has a diamond volume content that is greater than that of the second diamond bonded volume.

3. The construction as recited in claim 2 wherein the diamond volume content of the first diamond bonded volume is greater than about 94 percent.

4. The construction as recited in claim 1 wherein a population of the interstitial regions in the first diamond bonded volume comprises a catalyst material used to form the first diamond bonded volume.

5. The construction as recited in claim 1 wherein the substrate comprises an amount of a hard material that is different from that in an initial substrate comprising a catalyst material used to form the first diamond bonded volume during the first high-pressure/high-temperature process.

6. The construction as recited in claim 1 wherein the diamond body includes a region comprising interstitial regions substantially free of a catalyst material used to form the diamond body.

7. The construction as recited in claim 6 wherein the region substantially free of a catalyst material extends a partial depth in the first region from a working surface of the diamond body.

8. The construction as recited in claim 6 wherein the diamond body includes a replacement material disposed within the interstitial regions substantially free of the catalyst material.

9. The diamond bonded construction as recited in claim 1 wherein the first diamond bonded volume is formed in the presence of a catalyst selected from the group consisting of Co, Ni, Fe, Cu and combinations thereof.

10. A bit for drilling subterranean formations comprising a body and a number of cutting elements operatively attached thereto, wherein one or more of the cutting elements comprises the diamond bonded construction of claim 1, and wherein such diamond bonded construction is attached to the bit by the substrate.

11. A diamond bonded construction comprising:
a diamond body comprising a first diamond bonded region that extends from a top surface of the body and is attached to a second diamond bonded region and that covers an entire surface of the second diamond bonded region, wherein the first diamond bonded region has a diamond volume content greater than the second diamond region and is formed during a first high-pressure/high-temperature process, and wherein both the first and second diamond bonded regions have a microstructure comprising a matrix phase of intercrystalline bonded diamond and a plurality of interstitial regions dispersed within the matrix phase; and
a metallic substrate attached to the second diamond bonded region during a second high-pressure/high-temperature process used to form the second diamond bonded region, wherein the second high-pressure/high-temperature process is at a pressure less than that of the first high-pressure/high-temperature process, and wherein the second diamond bonded region is interposed between the substrate and the first diamond bonded region.

12. The construction as recited in claim 11 wherein the diamond volume content of the first diamond bonded region is greater than about 94 percent.

13. The construction as recited in claim 11 wherein the first diamond bonded region is formed from diamond grains having an average grain size of less than about 10 microns.

14. The construction as recited in claim 11 wherein the diamond body first diamond bonded region comprises a catalyst material disposed in a population of the interstitial regions dispersed within the matrix phase.

15. The construction as recited in claim 14 wherein a population of the interstitial regions in the second diamond bonded region comprises a catalyst material disposed therein infiltrated from the substrate.

16. The construction as recited in claim 15 wherein the first diamond bonded region comprises a population of the interstitial regions that are substantially free of the catalyst material.

17. The construction as recited in claim 16 wherein the first diamond bonded region includes a replacement material disposed within the interstitial regions substantially free of the catalyst material.

18. The diamond bonded construction as recited in claim 11 wherein the first diamond bonded volume is formed in the presence of a catalyst selected from the group consisting of Co, Ni, Fe, Cu and combinations thereof.

19. A bit for drilling subterranean formations comprising a body and a number of cutting elements operatively attached thereto, wherein one or more of the cutting elements comprises the diamond construction of claim 11.

\* \* \* \* \*